(12) United States Patent
Kuwayama et al.

(10) Patent No.: US 7,330,766 B2
(45) Date of Patent: Feb. 12, 2008

(54) ELECTRONIC DEVICE SYSTEM

(75) Inventors: Kenji Kuwayama, Tokorozawa (JP); Akio Segawa, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 157 days.

(21) Appl. No.: 10/532,228

(22) PCT Filed: Oct. 24, 2003

(86) PCT No.: PCT/JP03/13661

§ 371 (c)(1),
(2), (4) Date: Apr. 22, 2005

(87) PCT Pub. No.: WO2004/039010

PCT Pub. Date: May 6, 2004

(65) Prior Publication Data

US 2006/0047345 A1    Mar. 2, 2006

(30) Foreign Application Priority Data

Oct. 25, 2002    (JP)    ............................. 2002-311341

(51) Int. Cl.
*G05B 19/18* (2006.01)
(52) U.S. Cl. ......................................................... 700/3
(58) Field of Classification Search .................... 700/2, 700/3, 8, 9, 11, 20
See application file for complete search history.

(56) References Cited

U.S. PATENT DOCUMENTS

| | | | |
|---|---|---|---|
| 4,612,534 A | 9/1986 | Buehler et al. | |
| 5,583,754 A * | 12/1996 | Leonhardt et al. | 700/3 |
| 5,715,475 A | 2/1998 | Munson et al. | |
| 6,597,956 B1 * | 7/2003 | Aziz et al. | 700/3 |
| 6,618,628 B1 * | 9/2003 | Davlin et al. | 700/3 |
| 6,678,747 B2 * | 1/2004 | Goossen et al. | 710/2 |
| 6,952,618 B2 * | 10/2005 | Davlin et al. | 700/3 |

FOREIGN PATENT DOCUMENTS

| | | |
|---|---|---|
| EP | 0 093 872 A | 11/1983 |
| EP | 1 176 484 A2 | 1/2002 |

(Continued)

OTHER PUBLICATIONS

European Search Report dated Oct. 19, 2007 issued in corresponding Application No. 03758899.3-2416 PCT/JP0313661.

*Primary Examiner*—Thomas K. Pham
(74) *Attorney, Agent, or Firm*—Westerman, Hattori, Daniels & Adrian, LLP.

(57) ABSTRACT

An electronic device system (10) includes an electronic device unit (parent device) (1) connected to an external device (5) and a plurality of electronic device units (child devices) (2 to 4) connected in series to it. An initialization instruction from a CPU (20) of the parent device (1) turns off all the switches (22) for opening/closing the RS-485 line connecting all the electronic device units. The parent device (1) successively generates identification codes (ID). A parent device (1) starts to set the code as its ID and turns on the switch (22) of the electronic device unit after the setting is complete. Thus, ID's are automatically set from the parent device (1) to the child devices (2 to 4) successively in the order of the connection.

10 Claims, 7 Drawing Sheets

FOREIGN PATENT DOCUMENTS

| | | |
|---|---|---|
| GB | 2 286 750 A | 8/1995 |
| JP | 62-95042 | 5/1987 |
| JP | 7-143130 | 6/1995 |
| JP | 10-93565 | 4/1998 |
| JP | 10-257672 | 9/1998 |
| JP | 2001-211176 | 8/2001 |

* cited by examiner

PRIOR ART

ELECTRONIC DEVICE SYSTEM

TECHNICAL FIELD

The present invention relates to an electronic device system composed of a plurality of electronic device units connected in series which are capable of transmitting/receiving data to/from an external device.

BACKGROUND TECHNOLOGY

It is widely performed that a plurality of electronic device units having similar configurations and functions are used and controlled by a common control unit (a controller or a personal computer) and data collected from them is processed.

For example, when the shape of a cam shaft being a part of an engine of an automobile is measured, it is necessary to measure the displacement according to the rotation angle of each cam provided on the cam shaft.

Figure 11:
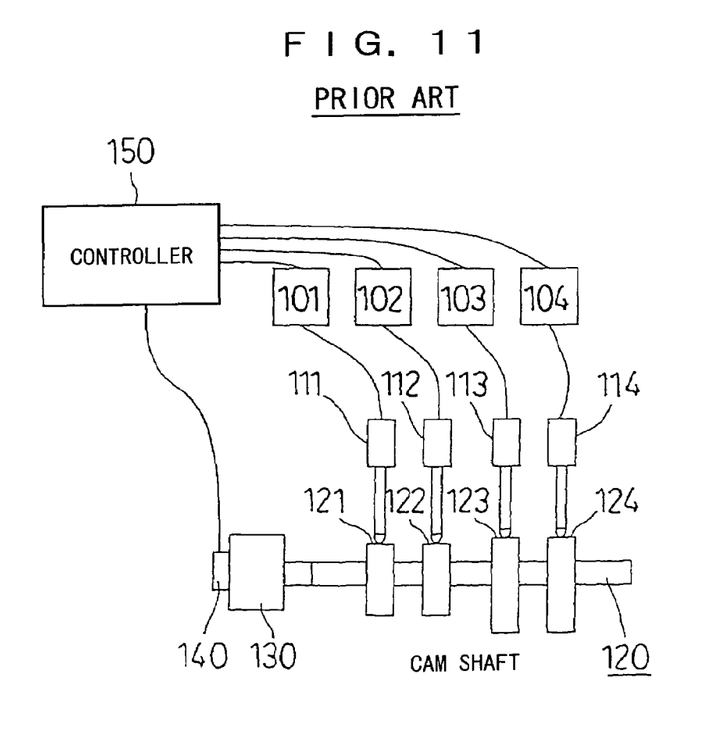
FIG. 11 is a configuration diagram showing an example of a conventional electronic device system for measuring the shapes of cams of a conventional cam shaft.

In this case, conventionally, probes of detectors 111 to 114 connected to a plurality of measuring electronic device units 101 to 104 respectively are made individually to abut on cam surfaces of cams 121 to 124 of a cam shaft 120 and the detectors 111 to 114 are secured on a line that is parallel to the axis of the cam shaft 120 and separated from the axis by a fixed distance, as shown in FIG. 11.

The measurement is performed by inputting a pulse signal generated for every fixed rotation angle of the cam shaft 120 into a controller 150 from an encoder 140 attached to a motor 130 for rotating the cam shaft 120, separately inputting positional signals detected by the measuring electronic device units 101 to 104 into the controller 150 so that the controller 150 stores the positional signals for the cams 121 to 124 for every fixed rotation angle of the cam shaft 120 so as to observe the changes in the positional signals.

However, in this arrangement, the controller 150 directly controls the measuring electronic device units 101 to 104 and separately collects the positional signals detected by the units, resulting in increased load on the controller 150 and many connection lines to the measuring electronic device units 101 to 104.

Hence, it is conceivable to regard the measuring electronic device unit 101 at the head as a parent device and connect to the parent device in series the other electronic device units 102 to 104 as child devices, so that the controller 150 directly transmits/receives data only to/from the measuring electronic device unit 101 being the parent device, whereby measurement data of the electronic device units 102 to 104 being child devices can be collected through the parent device.

In this case, it is necessary to set individual identification codes (hereinafter referred to as "IDs") in the measuring electronic device units 101 to 104 so that the controller 150 can send an instruction while identifying each of the measuring electronic device units 101 to 104 and collect the measurement data.

Conventional methods employed as a method for setting a plurality of electronic device unit IDs as described above include a method of setting the IDs by hand in a hardware setting means such as a DIP switch provided in each of the electronic device units, and a method of software setting of the IDs by an operator through key input.

The setting of IDs by the methods as described above, however, requires much labor, and the hardware setting of IDs leads to increased cost. In addition, both cases may have a problem of occurrence of setting mistakes such as setting errors or the double settings of IDs. Further, when the electronic device units constituting the system are replaced, added, or deleted, IDs need to be set again, bringing about a problem of troublesome operation for the setting.

Hence, there is a method of previously providing unique IDs to the individual electronic device units, which method has the problem of requiring the operation of registering their IDs in an external device such as a controller or a personal computer which controls the electronic device units, and the problem of, when the electronic device units constituting the system are replaced, added, or deleted, having to set changed IDs again in the external device with every change.

DISCLOSURE OF THE INVENTION

The invention has been developed to solve the above-described problems and its object is to make it possible to automatically set IDs in a plurality of electronic device units connected in series to constitute an electronic device system, thereby eliminating a troublesome setting operation to prevent occurrence of setting mistakes and to cope with rearrangement of the system without problem.

To achieve the above-described object, an electronic device system according to the invention including an electronic device unit being a parent device including a connector for connecting to an external device and a connector for connecting to another electronic device unit, the parent device having a function of transmitting/receiving data to/from the external device, and a plurality of electronic device units being child devices each including two connectors for connecting to other electronic device units, the child devices being connected to the parent device in series for use, wherein the parent device has means for successively generating identification codes (IDs) for the electronic device units, and the electronic device units have means for automatically setting the successively generated IDs as own IDs respectively in the order of series connection beginning from the parent device.

Further, if each of the plurality of electronic device units has a function of setting the ID generated by the electronic device unit being the parent device as the own ID and then reporting that the unit has completed the ID setting to the electronic device unit connected next, the electronic device unit receiving the report of completion of the ID setting from the preceding electronic device unit, can set as its own ID the ID to be generated next from the parent device.

Further, the parent device preferably has means for determining that all of the child devices have completed setting of the identification codes when the parent device issues an identification code setting instruction to the child devices and then receives no answer of setting completion from the child devices within a predetermined period previously set.

The electronic device system according to the invention may also be an electronic device system including a plurality of electronic device units each including a connector connectable to an external device and another electronic device unit, and a connector for connecting to another electronic device unit, the plurality of electronic device units being connected in series for use.

In this case, each of the plurality of electronic device units includes: recognition means for recognizing itself to be a parent device because none of the electronic device units is connected in front of the unit itself and the other electronic device unit is connected behind the unit itself, or recognizing itself to be a child device because the other electronic device unit is connected in front of the unit itself; means for successively generating identification codes for the electronic device units, when the unit recognizes itself to be a parent device by the recognition means; and means for automatically setting as the own identification code one of the identification codes successively generated from the electronic device unit which has recognized itself to be the parent device, in the order of series connection beginning from the electronic device unit which has recognized itself to be the parent device, when the unit recognizes itself to be a child device by the recognizing means.

Further, each of the plurality of electronic device units preferably includes means for automatically setting as an identification code of the parent device the first identification code which the unit itself has generated, when the unit recognizes itself to be a parent device by the recognition means.

Further, each of the plurality of electronic device units more preferably includes means for recognizing itself to be the last electronic device unit because none of the other electronic device units is connected behind the unit itself and transmitting the fact to the electronic device unit which has recognized itself to be the parent device.

Furthermore, each of the plurality of electronic device units preferably has means for determining that all of the other electronic device units have completed setting of the identification codes when the unit issues an identification code setting instruction to the other electronic device units and then receives no answer of setting completion from the other electronic device units within a predetermined period previously set, when the electronic device unit recognizes itself to be a parent device.

BEST MODE FOR CARRYING OUT THE INVENTION

To describe the invention in more detail, preferred embodiments of the invention will be described with reference to the accompanying drawings.

Figure 2:
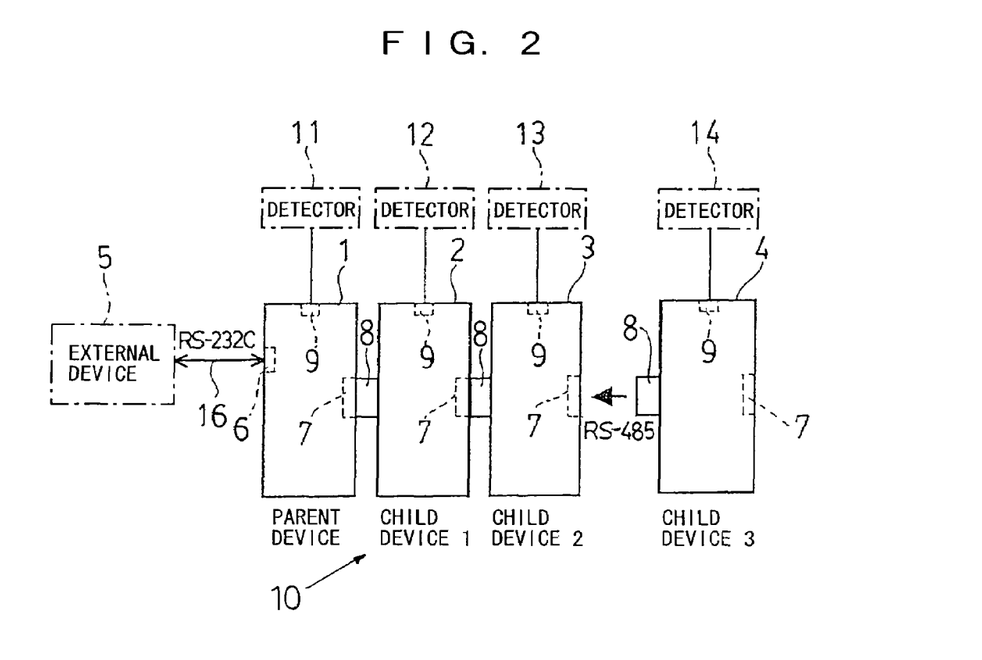
FIG. 2 is a schematic diagram showing an embodiment of an electronic device system according to the invention.

FIG. 2 is a schematic diagram showing an embodiment of an electronic device system according to the invention which is composed of four electronic device units 1 to 4. The electronic device unit 1 out of them is a parent device which includes a female connector (an external device interface) 6 for connecting to an external device 5 having a data processing function and a female connector (a downstream device interface) 7 for connecting to the other electronic device units (child devices), and thus has a function of transmitting/receiving data to/from the external device 5.

The electronic device units 2 to 4 are the child devices each including two connectors for connecting to the other electronic device units. In this example, a male connector (an upstream device interface) 8 is provided on one of two parallel faces of a thin rectangular parallelepiped case having a larger area than that of the other faces, and a female connector (a downstream device interface) 7 is provided on the other of the two parallel faces.

To the electronic device unit 1 being the parent device, the electronic device units 2 to 4 being child devices are mechanically and electrically connected in series and in sequence by fitting between the connectors 7 and 8, thus constituting an electronic device system 10.

For use of the electronic device system 10, the external device such as a personal computer or a controller is connected to the female connector 6 of the electronic device unit 1 being the parent device using an RS-232C interface cable 16, and detectors 11 to 14 are connected to connectors 9 for the detectors provided on side faces of the electronic device units 1 to 4. The detectors 11 to 14 can be detectors for displacement measurement similar to the detectors 111 to 114 shown in the above-described FIG. 11, and other various detectors can be connected, such as for voltage, resistance, temperature, pressure, amount of light, volume, and distortion amount. The electronic device units 1 to 4 include circuits and so on corresponding to the detectors to be connected thereto, and different kinds of detectors may be connected to the electronic device units, respectively.

The electronic device unit 1 being the parent device out of the electronic device units 1 to 4 constituting the electronic device system 10 can directly transmit/receive data to/from the external device 5, whereas the electronic device units 2 to 4 being child devices can transmit/receive data to/from the external device 5 via the parent device or via the parent device and the other child devices.

It should be noted that power is fed from the external device 5 to the electronic device unit 1 being the parent device via a power cable and then fed also to all of the electronic device units 2 to 4 being child devices via power terminals in the connectors 7 and 8 and power lines within the child devices.

Incidentally, in order for the external device 5 to transmit/receive data to/from the electronic device units 1 to 4, it is necessary to set identification codes (IDs) in the electronic device units 1 to 4 respectively so as to be able to identify to which electronic device unit the external device 5 transmits data or from which electronic device unit the external device 5 has received data.

A configuration for automatically setting the IDs and a function thereof will be described below.

Figure 1:
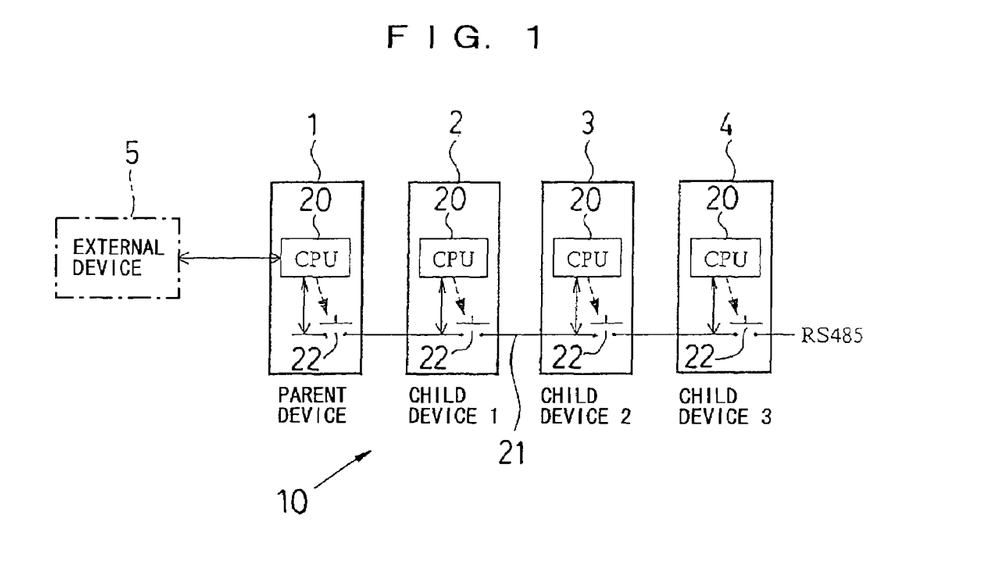
FIG. 1 is a configuration diagram of a first embodiment showing only a portion relating to setting of IDs in an electronic device system shown in FIG. 2.

FIG. 1 is a configuration diagram of a first embodiment showing only a part relating to the setting of the IDs in the above-described electronic device system 10.

All of the electronic device units 1 to 4 being the parent device and the child devices each incorporate a microcomputer (hereinafter, abbreviated as a "CPU") 20, which is composed of a CPU, a ROM and a RAM being memories, and so on. All of the electronic device units 1 to 4 are also connected to one another by an RS-485 interface line 21 via the respective connectors, and the interface line 21 is connected to the respective CPUs 20. The electronic device units 1 to 4 include switches (actually two circuits) 22 which open and close the interface line 21, and opening/closing of each of the switches 22 is controlled by the CPU 20.

ID setting actions in the electronic device system 10 will be described with FIG. 3 to FIG. 5. In these drawings and the following description, the electronic device unit 1 is called as a "parent device", and the electronic device units 2 to 4 are called as a "child device 1," a "child device 2," and a "child device 3" as also shown in FIG. 1.

Figure 3:
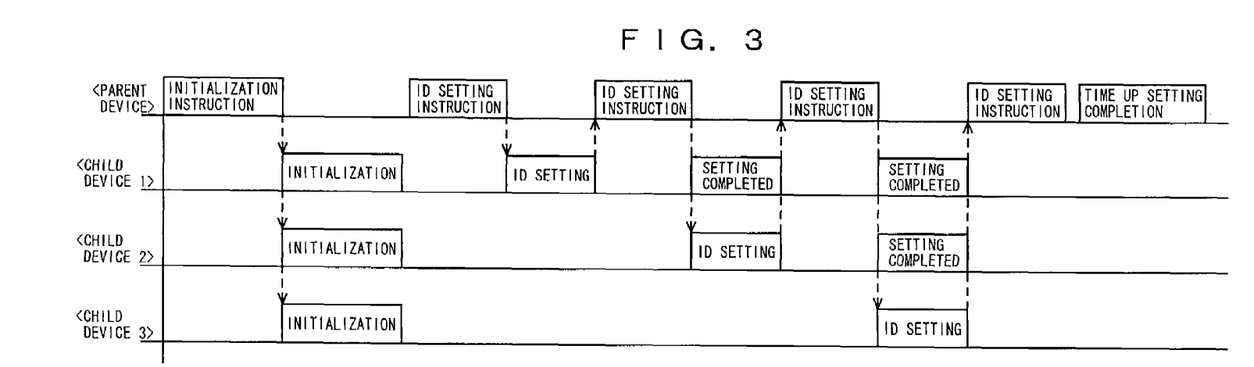
FIG. 3 is an explanatory diagram showing the outline of the ID setting in the electronic device system shown in FIG. 1.
Figure 4:
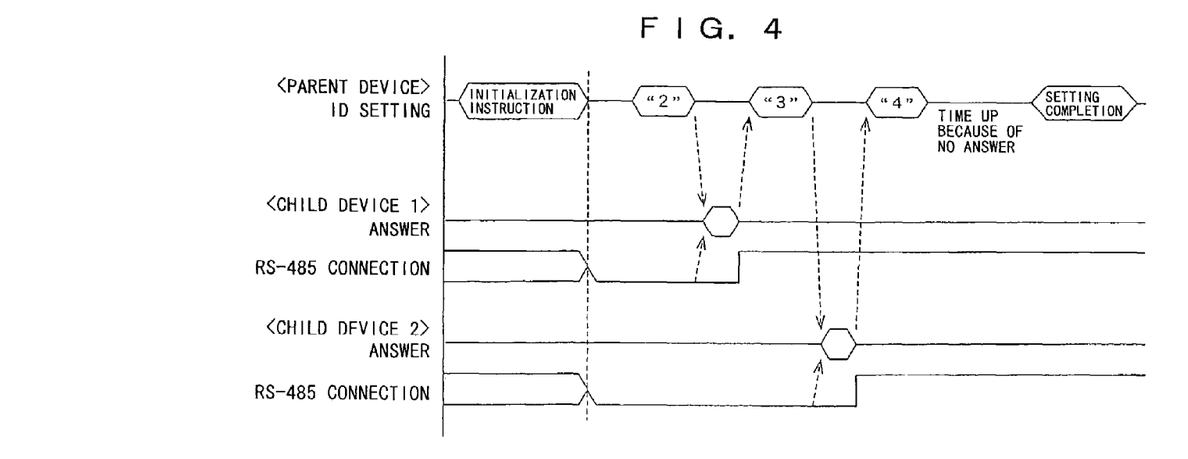
FIG. 4 is a time chart showing details of actions of the ID setting.

FIG. 3 shows the outline of the ID setting, and FIG. 4 is a time chart showing details of the setting, with the child device 3 being omitted in FIG. 4.

As shown in these drawings, the parent device first outputs an initialization instruction (an initialization command) to all of the child devices via the RS-485 interface line 21 shown in FIG. 1.

However, the child devices have automatically performed initialization processing when power is turned on, thereby turning off the switches 22 (bringing the RS-485 connection to Low). For this reason, when the processing of the ID automatic setting is started when the electronic device system 10 is fed with power from the external device 5, the initialization instruction from the parent device does not need to be transmitted to the child devices. The case where the initialization instruction (the initialization command) from the parent device becomes effective is only when the ID is set again after setting once. In this case, the switches 22 of all of the child devices are on (the RS-485 connection is at High), so that the initialization instruction is transmitted to all of the child devices. This initializes all of the child devices, and the CPUs 20 shown in FIG. 1 turn off the switches 22 (bring the RS-485 connection to Low).

Though not shown in FIG. 3 and FIG. 4, the CPU 20 of the parent device generates a first ID "1" in this event and sets it as its own ID (stores it in the RAM of the CPU 20). The CPU 20 then turns on its own switch 22 (brings the RS-485 connection to High).

Thereafter, the parent device generates a next ID "2" and outputs an ID setting instruction. The child device 1 receives the instruction and sets "2" as its own ID, and outputs an answer of setting completion to the parent device and turns on its own switch 22 (brings the RS-485 connection to High).

Subsequently, the parent device generates an ID "3" and outputs an ID setting instruction. The child device 2 receives the instruction and sets "3" as its own ID, and outputs an answer of setting completion to the parent device and turns on its own switch 22 (brings the RS-485 connection to High).

Subsequently, the parent device generates an ID "4" and outputs an ID setting instruction. The child device 3 receives the instruction and sets "4" as its own ID, and outputs an answer of setting completion to the parent device and turns on its own switch 22 (brings the RS-485 connection to High), but there is no child device connected next. In the case of FIG. 4, since the child device 3 is not connected, there is no answer of setting completion within a predetermined period to the setting instruction of the ID "4" from the parent device, and the setting is completed because time is up.

In the case of FIG. 3, since there is an answer from the child device 3, the parent device generates a next ID "5" and outputs an ID setting instruction, but since no child device is connected next, there is no answer of setting completion within a predetermined period, and the setting is completed because time is up.

In the above manner, the parent device successively generates IDs for the electronic device units, and the electronic device units 1 to 4 automatically set the successively generated IDs "1 to 4" as their own IDs respectively in the order of the child devices connected in series to the parent device, beginning from the parent device.

Actions of the parent device and the child devices at the time of ID automatic setting will be described in detail with a flowchart shown in FIG. 5. The ID automatic setting is performed, for example, every time power is turned on.

When starting this processing, the parent device first outputs an initialization command. All of the child devices are initialized when power is turned on, and the CPUs 20 in the electronic device units 2 to 4 being child devices shown in FIG. 1 turn off their own switches 22 (bring the RS-485 connection to Low), and otherwise they are initialized according to the initialization command from the parent device. After completion of the initialization, the CPU 20 of the parent device sets "1" for the first ID and sets it as its own ID, and then turns on the switch 22 of the parent device (the electronic device unit 1) shown in FIG. 1 (brings the RS-485 connection to High).

Thereafter, the parent device increases one ID as "2" and outputs an ID setting instruction to the RS-485 interface line 21.

Then, only the child device 1 (the electronic device unit 2) connected with the RS-485 interface line 21 receives the instruction and determines whether or not its own RS-485 connection is Low (the switch 22 in FIG. 1 is off), and if the determination is NO, the child device 1 ends the processing as it is. However, the determination is YES in this case, and therefore the child device sets the ID "2" as its own ID and outputs an answer of setting completion to the parent device, and then turns on its own switch 22 to bring the RS-485 connection to High.

Upon receipt of the answer from the child device, the parent device (the electronic device unit 1) increases again one ID as "3" and outputs an ID setting instruction.

Since connection of the RS-485 interface line 21 from the parent device to the child device 2 is established this time, the child device 1 (the electronic device unit 2) and the child device 2 (the electronic device unit 3) receive the instruction, but the child device 1 performs nothing to an end because its RS-485 connection is High which means its ID has already been set. The child device 2 sets the received ID "3" as its own ID because its RS-485 connection is Low, and outputs an answer of setting completion to the parent device and then turns on its own switch 22 to bring its RS-485 connection to High.

Upon receipt of the answer, the parent device (the electronic device unit 1) increases again one ID as "4" and outputs an ID setting instruction.

In the above manner, the parent device increases one ID and outputs an ID setting instruction every time it receives an answer from the child device. The child device with its switch 22 being off and its RS-485 connection being Low out of the child devices which have received the instruction, sets the ID as its own ID and outputs an answer to the parent device, and then turns on its switch 22 to bring its RS-485 connection to High. This action is repeated so that IDs are set in the parent device and all of the child devices connected thereto, and if the parent device cannot receive an answer of setting completion from the child device within a predetermined period after the parent device outputs an ID setting instruction, the processing is ended.

Also when four or more child devices are connected, this action is repeated until after IDs are set in all of the child devices in a similar manner.

These kinds of processing are performed by the CPU 20 in the parent device (the electronic device unit 1) and the CPUs 20 in the child devices (the electronic device units 2 to 4) shown in FIG. 1.

More specifically, in this embodiment, the CPU 20 in the parent device functions as means for successively generating identification codes (IDs) for the electronic device units 1 to 4, and the CPUs 20 in the electronic device units 1 to 4 function as means for automatically setting the successively generated IDs as their own IDs in the order of series connection to the parent device.

Further, the CPU 20, together with the switch 22, in each of the electronic device units 1 to 4 sets as its own ID the ID generated by the electronic device unit 1 being the parent device, and thereafter turns on its own switch 22 to bring the RS-485 connection to High, thereby functioning to report that it has already set its ID to the electronic device unit connected next.

Further, the CPU 20 of the electronic device unit 1 being the parent device also functions as means for determining that all of the child devices have completed setting of the IDs when the CPU 20 issues an ID setting instruction to the child device and then receives no answer of setting completion from the child device within a predetermined period previously set.

Next, a configuration of a second embodiment of a part relating to the setting of the IDs in the electronic device system 10 shown in FIG. 2 and the ID automatic setting action thereby will be described with reference to FIG. 6 to FIG. 8.

Figure 6:
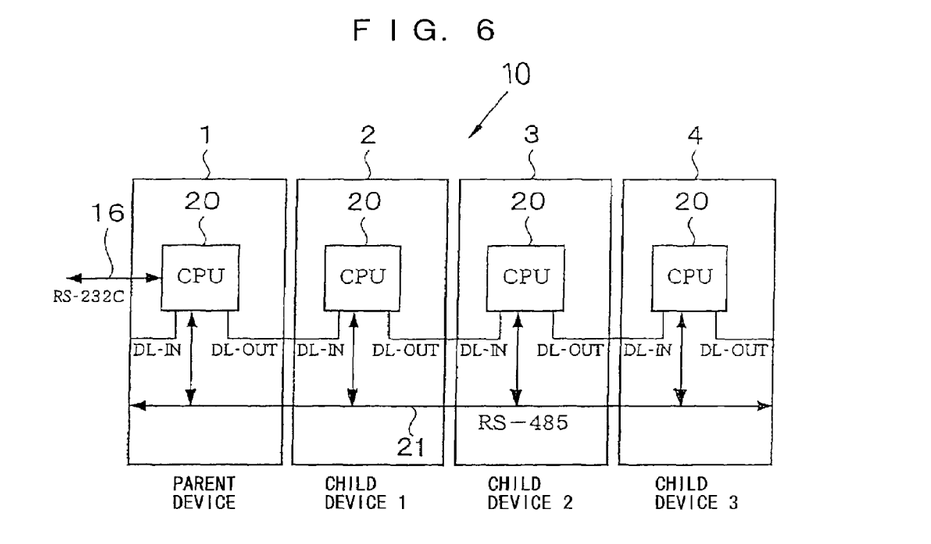
FIG. 6 is a configuration diagram of a second embodiment showing only a portion relating to setting of IDs in the electronic device system shown in FIG. 2.

FIG. 6 is a diagram showing a configuration of a part relating to the ID setting in which all of electronic device units 1 to 4 connected in series and constituting an electronic device system 10 are commonly connected in a skewered manner by an RS-485 interface line 21 so that CPUs 20 of the electronic device units 1 to 4 can mutually transmit/receive signals over the RS-485 interface line 21. Further, DL-INs and DL-OUTs of the CPUs 20 are connected in series.

In the second embodiment, the outline of the ID setting is similar to that of the first embodiment shown in FIG. 3. The second embodiment is different from the first embodiment only in that since all of the electronic device units are connected over the RS-485 interface line 21 at all times, the parent device can forcibly output an initialization instruction to all of the child devices via the RS-485 interface line 21; that the CPU 20 of the electronic device unit in which the ID has been set brings the DL-OUT to Low to report that the unit has already set its ID to the electronic device unit connected next; and that the child device determines whether to set as its own ID the ID generated by the parent device, depending on states of the DL-IN and the DL-OUT.

Figure 5:
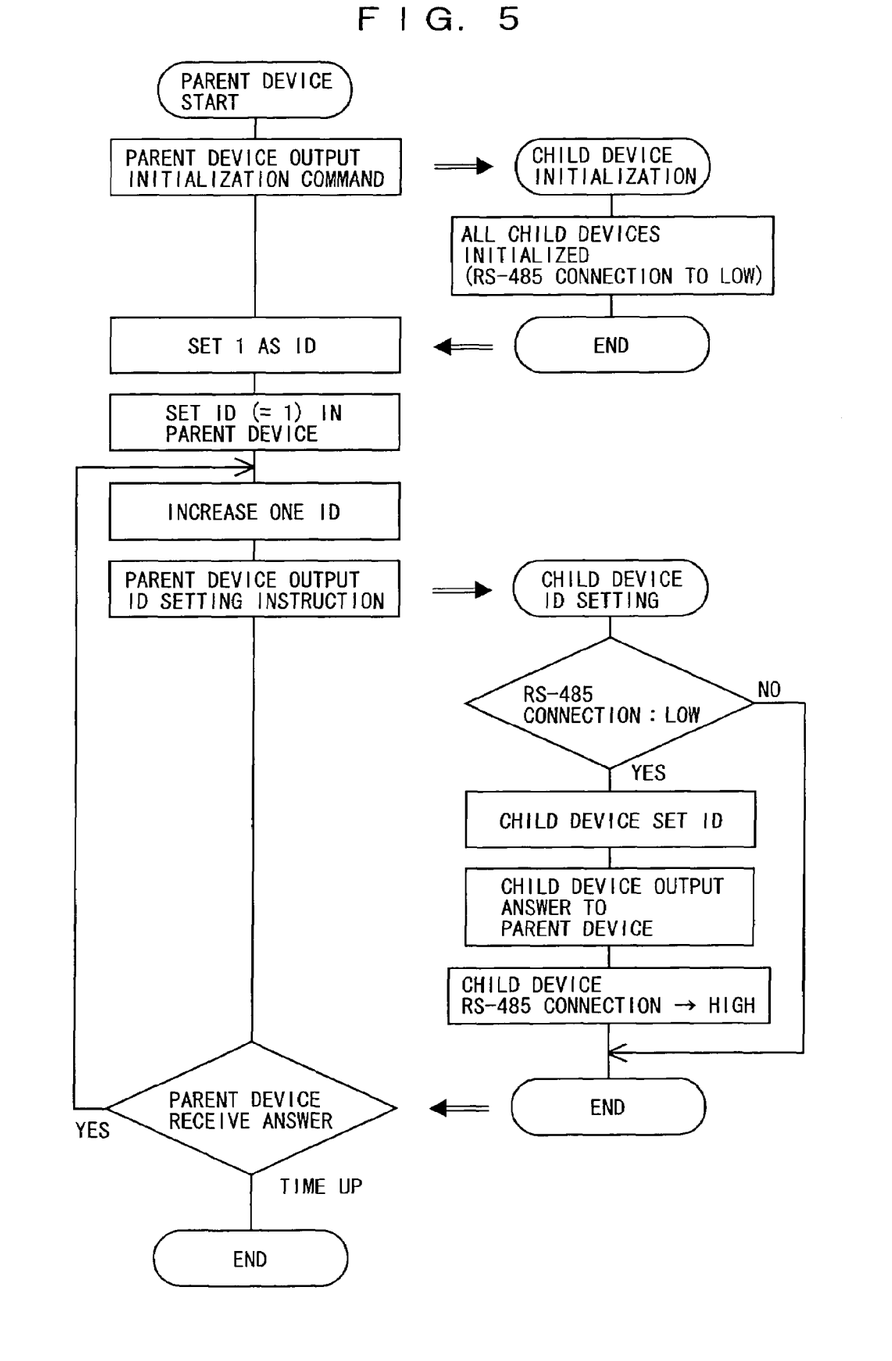
FIG. 5 is a flowchart similarly showing actions of a parent device and a child device at the time of ID automatic setting.
Figure 7:
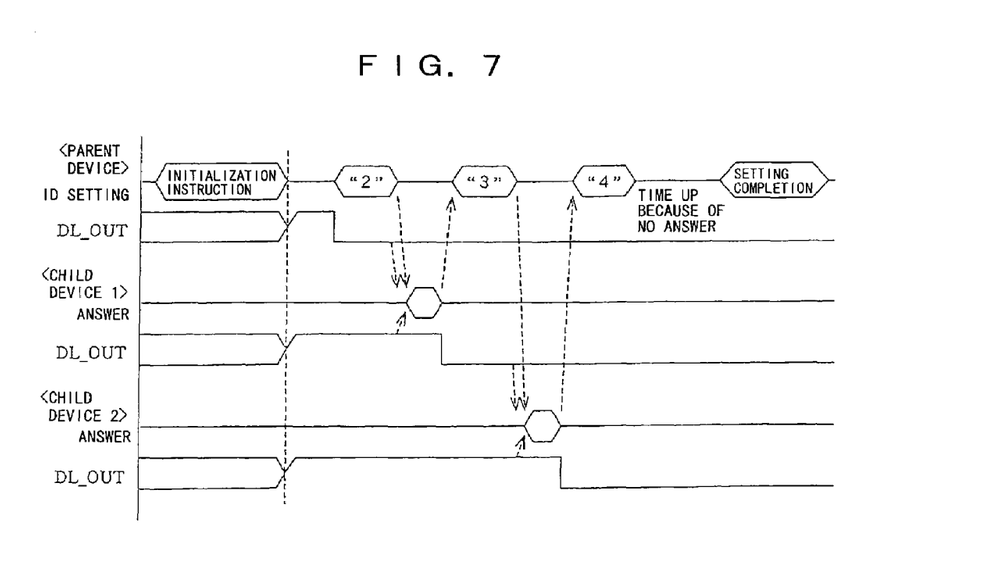
FIG. 7 is a time chart showing actions of the ID setting according to the second embodiment.
Figure 8:
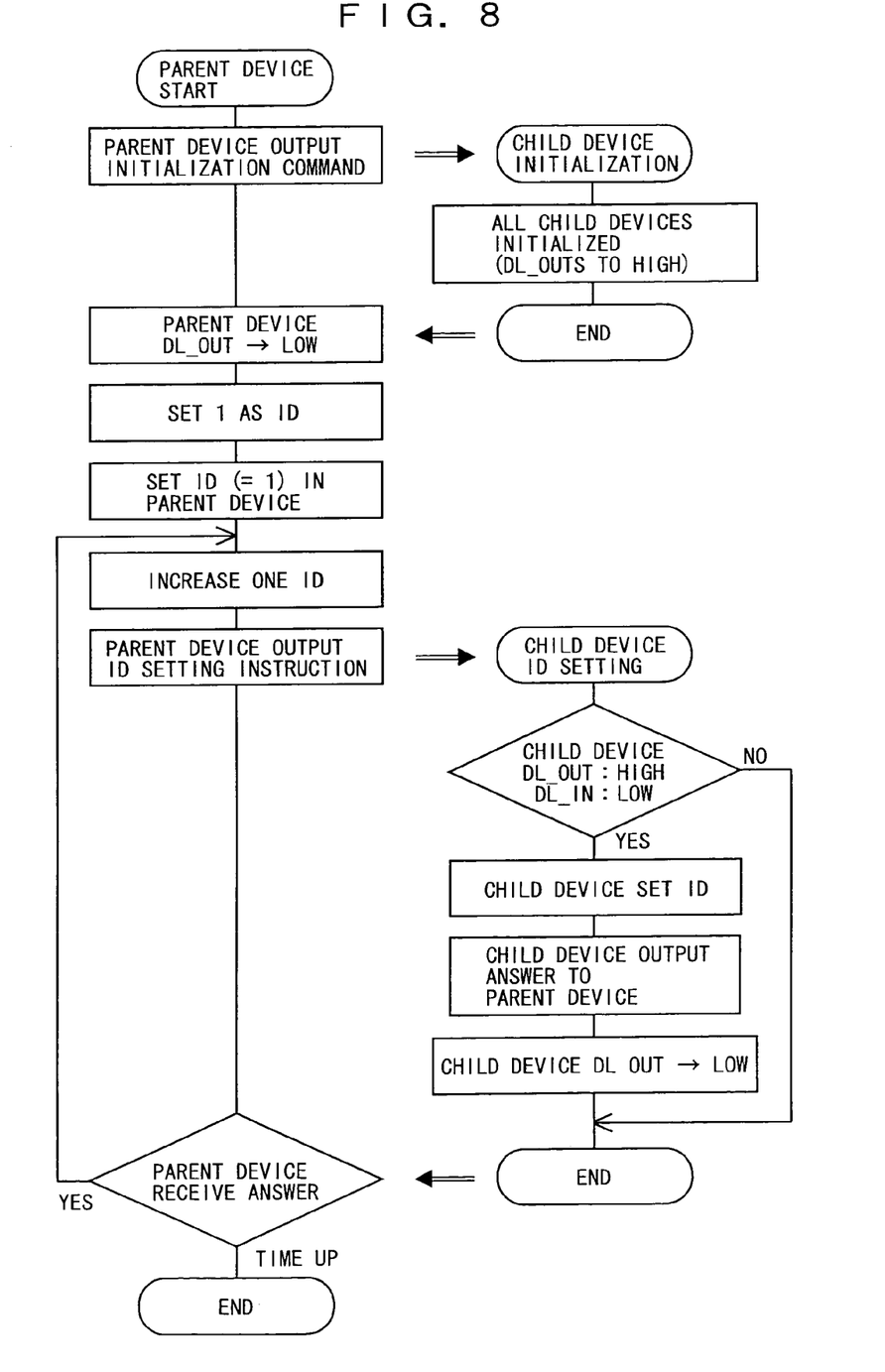
FIG. 8 is a flowchart similarly showing actions of a parent device and a child device at the time of ID automatic setting.

Therefore, a time chart in FIG. 7 and a flowchart in FIG. 8 are almost the same as those in FIG. 4 and FIG. 5 of the first embodiment except that when all of the child devices are initialized according to the initialization instruction (the initialization command) from the parent device, the DL-OUTs of their CPUs 20 are brought to High, and thereafter when the IDs successively generated by the parent device are set, their DL-OUTs are brought to Low.

Further, the ID setting instruction from the parent device is outputted to all of the connected child devices, which is different only in that only the child device with the DL-OUT being High and the DL-IN being Low sets its ID and outputs an answer of setting completion to the parent device and then performs processing of bringing the DL-OUT to Low.

The processing of the ID automatic setting is performed by the CPUs 20 in the electronic device units 1 to 4 shown in FIG. 6.

It has been described that the processing of the ID automatic setting is performed when power is turned on, however the processing could be performed by a key operation to the external device or the parent device. In addition, the processing may be performed when a specific condition such as error processing is established. Alternatively, it is also suitable to allow the setting to be also performed manually through a key operation on the external device or the electronic device units, or to allow either automatic setting or manual setting to be set using a DIP switch or a parameter.

The electronic device units 1 to 4 composed of the parent device and the plurality of child devices are connected in series and IDs of the electronic device units are set as described above, whereby the external device connected to the parent device (the electronic device unit 1) over an RS-232C interface cable for serial communication can determine the number of the connected electronic device units and start-up states and the presence or absence of failure of the units; request data, issue a zero-reset instruction, and set parameters with a specific electronic device unit being designated; and instruct a plurality of electronic device units to perform adding and subtracting calculation of measurement data.

For example, when five child devices are coupled to one parent device, that is, when six electronic device units, in total, are coupled (mechanically and electrically connected) to constitute the electronic device system, the ID of the parent device is "1" and the IDs of the child devices are "2 to 6" in the order from the closest to the farthest from the parent device. The external device connected only to the parent device can designate a desired electronic device unit by its ID. For example, when data of two devices, the parent device and the child device farthest from the parent device, among all of the electronic device units are required, the external device only needs to make a request for data from the parent device with ID=1 and ID=6 being designated.

Further, even if the connection order of the electronic device units constituting the electronic device system is changed, if part of the electronic device units are replaced with electronic device units having other functions, or if the number of the electronic device units to be connected is increased or decreased, there occurs no trouble because the IDs of the electronic device units after the change are automatically set again when power in turned on or the like.

It should be noted that the above-described embodiment shows an example in which the electronic device units constituting the electronic device system can be directly connected by the connectors to be mechanically and electrically connected together for use, thereby eliminating the necessity of connection cable between the electronic device units to realize an electronic device system which is compact in size and easy to use. Depending on applications, however, all or part of the electronic device units may be electrically connected in series via the connection cable. Any number of electronic device units being child devices may be connected in series.

Next, another embodiment of the electronic device system according to the invention will be described using FIG. 9. Also in FIG. 9, the same numbers are assigned to portions corresponding to those in FIG. 1 and FIG. 6 of the above-described embodiment, and description thereof is omitted.

An electronic device system 10' of this embodiment is different from the electronic device system 10 of above-described embodiment in that all of electronic devices 1 to 4 connected in series to constitute the electronic device system 10' have the same configuration.

The electronic device system 10' is also different in that each of the electronic device units 1 to 4 includes a connector 26 connectable to an external device and the other electronic device units, a connector 27 for connecting to the other electronic device units, and a control unit 20' including a microcomputer similar to the microcomputer (abbreviated as a CPU) 20 in the above-described embodiment. The CPU 20 shown in the above-described FIG. 1 and FIG. 6, however, also has input/output control circuits such as the RS-232C, RS-485, and so on actually, and therefore the CPU 20 and the control unit 20' are substantially equivalent.

Then, the connector 26 and the connector 27 are connected by an RS-485 interface line 21, and the interface line 21 is also connected to the control units 20'. Further, a signal line between the electronic device units including a DL-IN similar to that of the embodiment shown in FIG. 6 is connected between the control unit 20' and the connector 26, and a signal line between the electronic device units including a DL-OUT similar to that of the embodiment shown in FIG. 6 is connected between the control unit 20' and the connector 27.

Incidentally, in this embodiment, a connection pin for the RS-232C to be connected to the control unit 20' is also provided in the connector 26 in each of the electronic device units 1 to 4, so as to be connectable with the external device such as a personal computer or a controller over an RS-232C interface cable 16.

The plurality of electronic device units 1 to 4 are connected, by direct fitting between the connectors 26 and 27 or via the interface cable, to thereby be successively connected in series to constitute the electronic device system 10'.

The control unit 20' in each of the electronic device units 1 to 4 functions as a recognition means by recognizing itself to be the parent device because there is no electronic device unit connected in front of the unit itself and there is another electronic device unit connected behind the unit itself, or recognizing itself to be the child device because there is another electronic device unit connected in front of the unit itself.

Further, each of the control units 20' also has a function of, when recognizing itself to be the parent device by the recognizing means that is its own function, successively generating identification codes (IDs) for the electronic device units 1 to 4, or a function of, when recognizing itself to be the child device by the recognizing means, automatically setting as its own identification code one of the IDs successively generated from the electronic device unit, which has recognized itself to be the parent device (the electronic device unit 1 in the example of FIG. 9), in the order of series connection beginning from the electronic device unit which has recognized itself to be the parent device.

Each of the control units 20' also has a function of, when recognizing itself to be the parent device, automatically setting (storing in its memory), as an identification code of the parent device, the first identification code which the control unit 20' itself has generated.

Figure 9:
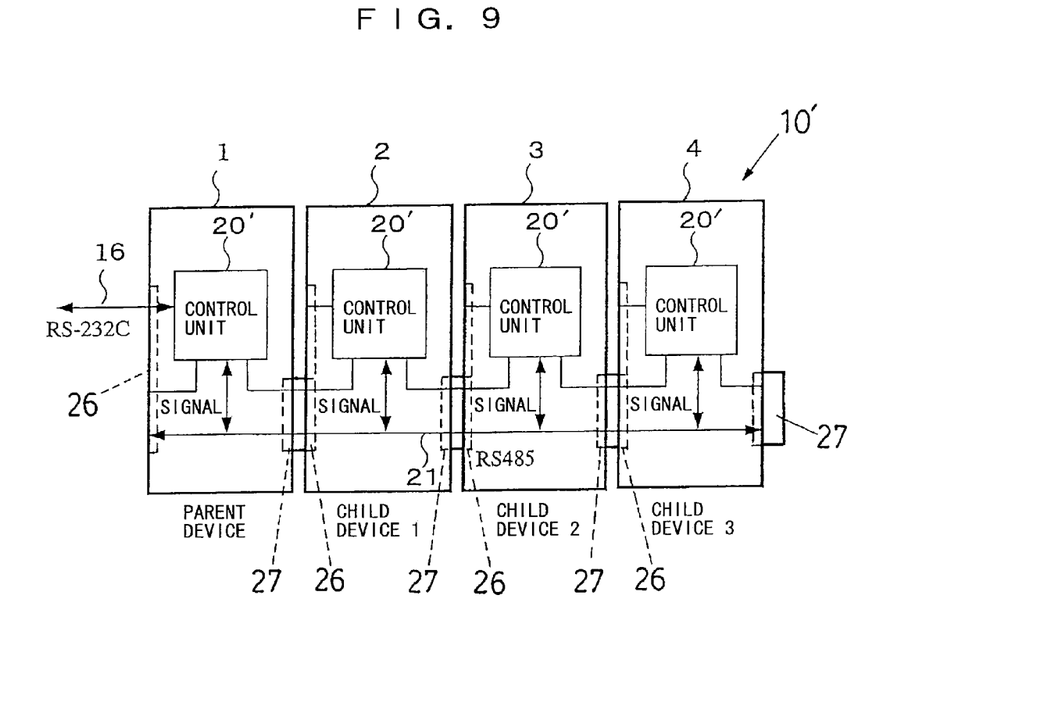
FIG. 9 is a schematic diagram showing another embodiment of the electronic device system according to the invention.

Furthermore, each of the control units 20' can recognize itself to be the last electronic device unit (the electronic device unit 4 in the example in FIG. 9) because none of the other above-described electronic device units is connected behind the unit itself, and transmit the fact to the electronic device unit which has recognized itself to be the parent device (the electronic device unit 1 in the example in FIG. 9).

Further, each of the control units 20', when recognizing itself as the parent device, can determine that all of the other electronic device units have completed setting of the IDs when it issues an ID setting instruction to the other electronic device units and then receives no answer of setting completion from the other electronic device units within a predetermined period previously set.

The number of the electronic device units constituting the electronic device system 10' is not limited to four, but any number, but more than one, of electronic device units having exactly the same configuration can be connected in series to constituted the electronic device system 10'.

Figure 10:
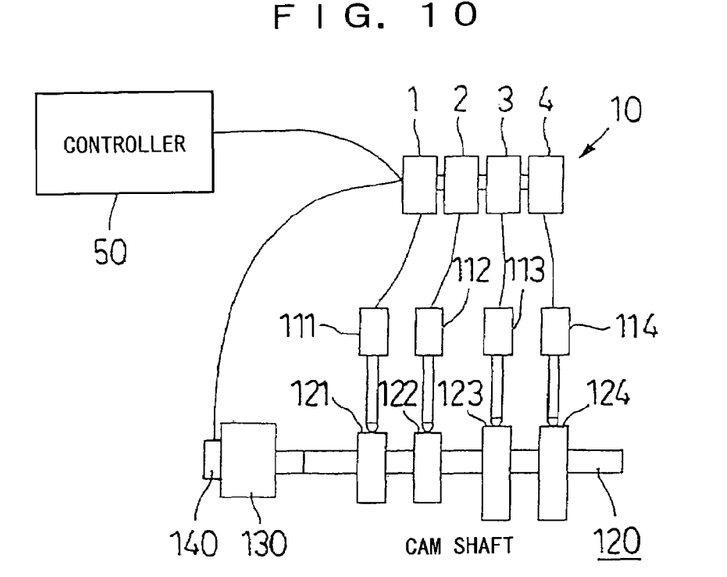
FIG. 10 is a configuration diagram showing an example when the electronic device system according to the invention is used to measure the shapes of cams of a cam shaft.

FIG. 10 shows a configuration example when the electronic device system according to the invention to measure the shapes of cams of a cam shaft in a similar manner as that of the conventional example shown in FIG. 11, in which the same numbers are assigned to the same portions as those in FIG. 11.

It is only required that a controller 50 is connected only to an electronic device unit 1 being the parent device of an electronic device system 10 or 10' using an RS-232C interface cable, and an output signal line of a rotation pulse of an encoder 140 is connected to the parent device. Detectors 111 to 114 for displacement measurement, which are the same as those shown in above-described FIG. 11, are connected to electronic device units 1 to 4 constituting the electronic device system 10 or 10'. This configuration reduces the load on the controller 50 as well as substantially decreases the number of connection lines.

INDUSTRIAL APPLICABILITY

As has been described, the electronic device system according to the invention can automatically set identification codes (IDs) in a plurality of electronic device units connected in series, thus eliminating a troublesome ID setting operation by hand so that occurrence of ID setting mistakes is prevented and the ID is automatically set again when power is turned on or the like even when the system is rearranged, bringing about no problem.

Consequently, the invention can be used in various electronic device systems composed of a plurality of electronic device units connected in series, for example, an electronic device system for measuring the plate thickness or shape, in which IDs can be automatically and surely set in the electronic device units.

What is claimed is:

1. An electronic device system comprising an electronic device unit being a parent device including a connector for connecting to an external device and a connector for connecting to another electronic device unit, the parent device having a function of transmitting/receiving data to/from the external device, and a plurality of electronic device units being child devices each including two connectors for connecting to other electronic device units, the child devices being connected to the parent device in series for use, wherein said parent device has means for successively generating identification codes for the electronic device units, and the electronic device units have means for automatically setting the successively generated identification codes as own identification codes respectively in the order of series connection beginning from said parent device.

2. The electronic device system according to claim 1, wherein
each of the plurality of electronic device units has a function of setting the identification code generated by the electronic device unit being said parent device as the own identification code and then reporting that the unit has completed the setting to the electronic device unit connected next.

3. The electronic device system according to claim 1, wherein
said parent device has means for determining that all of said child devices have completed setting of the identification codes when said parent device issues an identification code setting instruction to said child devices and then receives no answer of setting completion from said child devices within a predetermined period previously set.

4. The electronic device system according to claim 2, wherein
said parent device has means for determining that all of said child devices have completed setting of the identification codes when said parent device issues an identification code setting instruction to said child devices and then receives no answer of setting completion from said child devices within a predetermined period previously set.

5. An electronic device system comprising a plurality of electronic device units each including a connector connectable to an external device and another electronic device unit, and a connector for connecting to another electronic device unit, the plurality of electronic device units being connected in series for use, wherein
each of the plurality of electronic device units includes:
recognition means for recognizing itself to be a parent device because none of the electronic device units is connected in front of the unit itself and the other electronic device unit is connected behind the unit itself, or recognizing itself to be a child device because the other electronic device unit is connected in front of the unit itself;
means for successively generating identification codes for the electronic device units, when the unit recognizes itself to be a parent device by the recognition means; and
means for automatically setting as the own identification code one of the identification codes successively generated from the electronic device unit which has recognized itself to be said parent device, in the order of series connection beginning from the electronic device unit which has recognized itself to be said parent device, when the unit recognizes itself to be a child device by the recognizing means.

6. The electronic device system according to claim 5, wherein
each of the plurality of electronic device units includes means for automatically setting as an identification code of said parent device the first identification code which the unit itself has generated, when the unit recognizes itself to be a parent device by the recognition means.

7. The electronic device system according to claim 6, wherein
each of the plurality of electronic device units includes means for recognizing itself to be the last electronic device unit because none of the other electronic device units is connected behind the unit itself and transmitting the fact to the electronic device unit which has recognized itself to be said parent device.

8. The electronic device system according to claim 6, wherein
each of the plurality of electronic device units has means, when recognizing itself to be a parent device, for determining that all of the other electronic device units have completed setting of the identification codes when the unit issues an identification code setting instruction to the other electronic device units and then receives no answer of setting completion from the other electronic device units within a predetermined period previously set.

9. The electronic device system according to claim 5, wherein
each of the plurality of electronic device units includes means for recognizing itself to be the last electronic device unit because none of the other electronic device units is connected behind the unit itself and transmitting the fact to the electronic device unit which has recognized itself to be said parent device.

10. The electronic device system according to claim 5, wherein
each of the plurality of electronic device units has means, when recognizing itself to be a parent device, for determining that all of the other electronic device units have completed setting of the identification codes when the unit issues an identification code setting instruction to the other electronic device units and then receives no answer of setting completion from the other electronic device units within a predetermined period previously set.

* * * * *